(12) United States Patent
diGirolamo et al.

(10) Patent No.: US 7,299,593 B1
(45) Date of Patent: Nov. 27, 2007

(54) METAL HALF WALL AND A CONNECTOR ASSEMBLY FOR SECURING STUDS OF A HALF WALL TO AN UNDERLYING SUPPORT STRUCTURE

(75) Inventors: Edward R. diGirolamo, Raleigh, NC (US); Michael L. Torres, Raleigh, NC (US)

(73) Assignee: The Steel Network, Inc., Raleigh, NC (US)

( * ) Notice: Subject to any disclaimer, the term of this patent is extended or adjusted under 35 U.S.C. 154(b) by 685 days.

(21) Appl. No.: 10/349,675

(22) Filed: Jan. 23, 2003

Related U.S. Application Data

(63) Continuation-in-part of application No. 10/095,411, filed on Mar. 12, 2002.

(51) Int. Cl.
 *E04B 2/16* (2006.01)
 *E04B 2/30* (2006.01)
(52) U.S. Cl. ............... 52/241; 52/293.1; 52/293.2; 52/242; 52/274; 52/714
(58) Field of Classification Search ............ 52/293.3, 52/293.1, 714, 241, 242, 283, 274
 See application file for complete search history.

(56) References Cited

U.S. PATENT DOCUMENTS

| | | | | |
|---|---|---|---|---|
| 1,188,959 A * | 6/1916 | McAlarney | ............ | 52/600 |
| 1,709,778 A * | 4/1929 | Crozier | ............ | 52/350 |
| 2,321,671 A * | 6/1943 | La Grotta | ............ | 52/242 |
| 2,340,891 A * | 2/1944 | Manofsky | ............ | 52/242 |
| 2,368,620 A * | 2/1945 | Strom | ............ | 52/242 |
| 2,574,074 A * | 11/1951 | Vogel | ............ | 52/377 |
| 2,610,710 A * | 9/1952 | Shannon | ............ | 52/290 |
| 3,245,185 A * | 4/1966 | Rowe | ............ | 52/315 |
| 3,924,834 A * | 12/1975 | Young | ............ | 256/22 |
| 4,263,762 A * | 4/1981 | Reed | ............ | 52/293.3 |
| 4,373,304 A * | 2/1983 | Howitt | ............ | 52/73 |
| 5,295,335 A * | 3/1994 | Collier | ............ | 52/86 |
| 5,519,977 A * | 5/1996 | Callahan et al. | ............ | 52/712 |
| 5,794,395 A * | 8/1998 | Reed | ............ | 52/298 |
| 5,885,024 A * | 3/1999 | Zupan et al. | ............ | 403/389 |
| 5,979,130 A * | 11/1999 | Gregg et al. | ............ | 52/295 |
| 6,484,460 B2 * | 11/2002 | VanHaitsma | ............ | 52/293.1 |
| 6,523,322 B1 * | 2/2003 | Michalski et al. | ............ | 52/745.05 |

FOREIGN PATENT DOCUMENTS

JP             204228      * 11/1983  ............ 52/293.1

* cited by examiner

*Primary Examiner*—Lanna Mai
*Assistant Examiner*—Phi Dieu Tran A
(74) *Attorney, Agent, or Firm*—Coats & Bennett, P.L.L.C.

(57) ABSTRACT

A metal half wall is provided, with the wall including a lower track, an upper track and a series of spaced apart studs extending between the two tracks. A connector is disposed adjacent each stud for connecting the stud to the lower track and to a support structure lying underneath the lower track. Each connector includes an elongated member having opposite end portions. One end portion includes a turned end plate that extends generally perpendicular with respect to the elongated member. In the half wall, a connector is disposed directly adjacent a respective stud. So disposed, the elongated member extends upwardly next to an adjacent stud and the end plate extends over the lower track. A series of fasteners are connected between the elongated member and the adjacent stud, and between the end plate and the underlying lower track and support structure.

5 Claims, 8 Drawing Sheets

METAL HALF WALL AND A CONNECTOR ASSEMBLY FOR SECURING STUDS OF A HALF WALL TO AN UNDERLYING SUPPORT STRUCTURE

CROSS REFERENCE TO RELATED APPLICATION

This is a continuation-in-part of U.S. patent application Ser. No. 10/095,411 filed on Mar. 12, 2002.

FIELD OF THE INVENTION

The present invention relates to light metal framing and more particularly to a metal half wall structure having connectors for securing the studs of the half wall to an underlying support structure.

BACKGROUND OF THE INVENTION

Metal half walls are used from time to time in commercial as well as residential construction. Basically, a metal half wall comprises a pair of tracks, an upper and a lower track, and a series of spaced apart studs that are secured between the upper and lower tracks. Generally, the lower track is anchored to an underlying support structure such as a floor. Once framed, it is common to secure a wallboard such as a gypsum board to the outer sides of the framed wall.

Half walls are aesthetically pleasing and often very useful. However, half walls, because they are not anchored or supported at the top, generally have structural deficiencies. That is, because of the lack of any upper support structure securing the upper track, these half walls tend to be less stable, especially when encountering a side load. For example, side loads imposed upon such half wall structures tend to cause the half walls to deflect or tilt from side to side. Further, if there is inadequate support structure integrated into the lower portion of the half wall, the individual studs may be prone to twisting in response to certain side loads being applied.

Therefore, there has been and continues to be a need for improving the structural integrity of metal half walls.

SUMMARY OF THE INVENTION

The present invention entails a metal partial or half wall supported in part at least by an underlying support structure. The partial metal wall includes at least one elongated track and a series of spaced apart studs extending generally vertically from the track with each of the studs including a pair of flanges and a web extended between the flanges. Disposed adjacent each stud is a connector for connecting the stud and the lower track to the underlying support structure. In one embodiment, the connector includes an elongated member having opposite ends. One end of the connector forms an end plate and the end plate extends generally normal to the elongated member. Once positioned in the partial or half wall, the elongated member fits flush against an adjacent stud while the end plate fits flush against the underlying track or is spaced there above. A series of fasteners are secured between the elongated member and the adjacent stud, thereby securing the two together. Further, one or more fasteners are extended through the end plate and downwardly through the underlying lower track and into the underlying support structure.

In one particular embodiment, there is provided a reinforcing plate in association with each connector. In this particular embodiment, the reinforcing plate is disposed adjacent the lower track and the connector and adjacent stud are supported on the top portion of the reinforcing plate. Here one or more fasteners are extended through the end plate and downwardly through the reinforcing plate and on through the lower track and into the underlying support structure.

Another aspect of the present invention deals with providing a connector assembly that is specifically adapted to impart strength and rigidity to a metal half wall. Such a connector includes an elongated member that is disposed adjacent a stud formed in the half wall. Formed about the lower end of the elongated member is an end plate that forms an integral part of the connector as the same is turned and bent out of the plane of the elongated member or secured to the elongated member by other means. In use, the elongated member and end plate is set adjacent a stud and the underlying track. Fasteners are extended through the elongated member into the adjacent stud while additional fasteners are extended downwardly through the end plate, through the lower track and into an underlying support structure. In one particular embodiment, the elongated member is formed into a U-shaped channel such that it includes a pair of side flanges and a web extending between the flanges.

Further, the present invention entails a method for imparting strength and/or rigidity to a partial or half metal wall. This method includes forming a connector in the form of an elongated member having opposite ends and forming an end plate on one end of the elongated member such that the end plate extends generally normal to the elongated member. Thereafter the method entails setting the elongated member and the end plate adjacent to a half or partial stud in the wall structure such that the elongated member lies adjacent or flush with the adjacent stud. Further, the end plate is set adjacent the stud and adjacent the underlying lower track. Finally, the method entails securing the connector, including the elongated member and end plate, to the adjacent stud and the underlying lower track by extending fasteners through the connector into the adjacent structures.

Other objects and advantages of the present invention will become apparent and obvious from a study of the following description and the accompanying drawings which are merely illustrative of such invention.

DESCRIPTION OF EXEMPLARY EMBODIMENTS

With further reference to the drawings, the connector of the present invention is shown therein and indicated generally by the numeral 10. As will be appreciated from subsequent portions of the disclosure, connector 10 is adapted to be used in a building construction assembly and while the connector 10 may be utilized in different ways, in one exemplary embodiment the connector 10 is utilized to fasten or connect metal building studs to an underlying or overlying support structure.

Figure 1A:
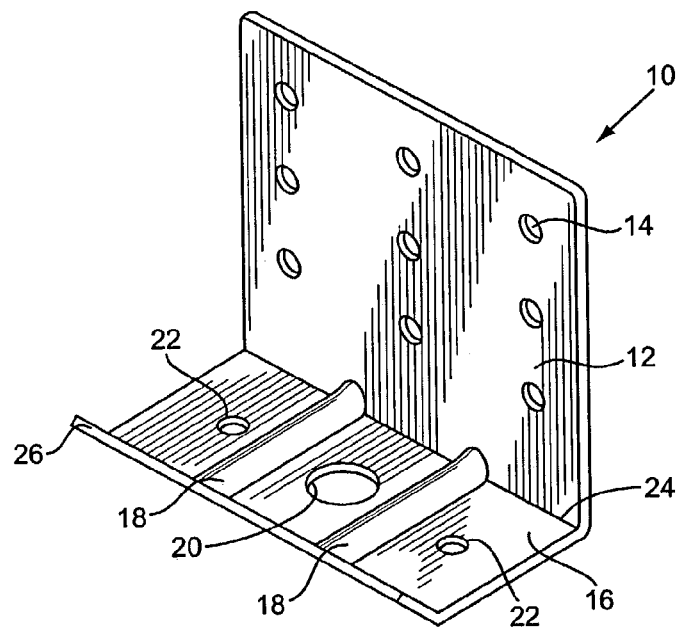
FIG. 1A is a perspective view of the connector of the present invention.
Figure 1B:
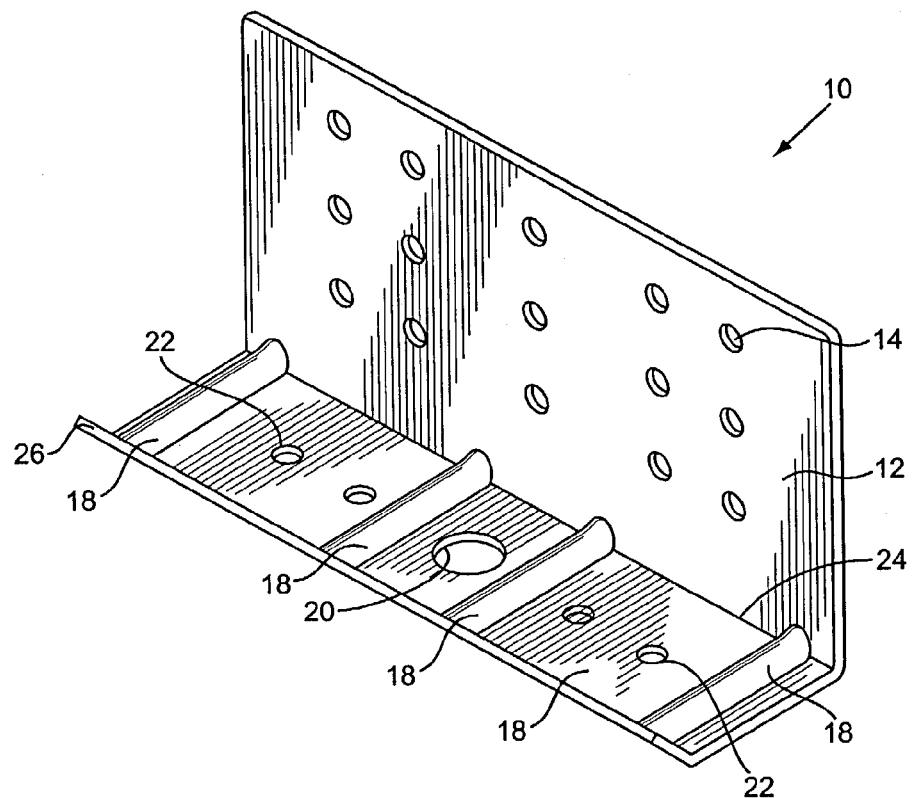
FIG. 1B is a perspective view of the connector of the present invention showing a somewhat wider embodiment that that shown in FIG. 1A.

Turning to a description of the connector 10, as seen in FIGS. 1A and 1B, the connector 10 includes a connecting plate 12. The connecting plate 12 includes a series of openings 14 that are designed to receive fasteners such as screws or bolts that act to secure the connector 10 to a vertical support member such as a building stud indicated generally by the numeral 50 in FIGS. 3 and 4.

Extending from the connecting plate 10 is a base plate 16. Base plate 16 includes a series of reinforcing ribs 18. The reinforcing ribs 18 extend generally perpendicular to a juncture or fold line indicated by the numeral 24. Further, base plate 16 includes one or more openings that enable fasteners to be extended downwardly through the base plate 16 so as to secure the entire connector 10 to an underlying structure such as a concrete floor, for example. In the case of the embodiments illustrated in FIGS. 1A and 1B, the openings formed in the base plate 16 include one central opening 18. In cases of both embodiments shown in FIGS. 1A and 1B, the central opening 20 is disposed generally centrally within the base plate 16 and between two ribs 18 that are disposed about a central area of the base plate 16. As will be appreciated from subsequent portions of the disclosure, central opening 20 is designed to enable a lag screw of substantial size to be extended downwardly through the opening for engagement with an underlying support structure. Such a lag screw, if used, will securely anchor the entire connector 10 to the underlying support structure. In addition, the base plate 16 includes one or more openings 22. Openings 22 in the case of the embodiments illustrated are somewhat smaller than the central opening 20. However, the size of all the openings can vary depending upon design and application. In any event, openings 22 are suitable for receiving other elongated fasteners such as screws or bolts that would be used also to secure and anchor the entire connector 10 to an underlying or overlying support structure such as a floor structure or beam.

Also comprising a part of connector 10 is an upturned flange 26. Note that upturned flange 26 extends from the base plate 16 opposite the juncture 24. The upturned flange can be formed by bending an edge portion of the base plate 16 upwardly. Alternatively, the upturned flange 26 can be a separate element or component and can be secured to the base plate 16 by weldment or suitable means.

Figure 2A:
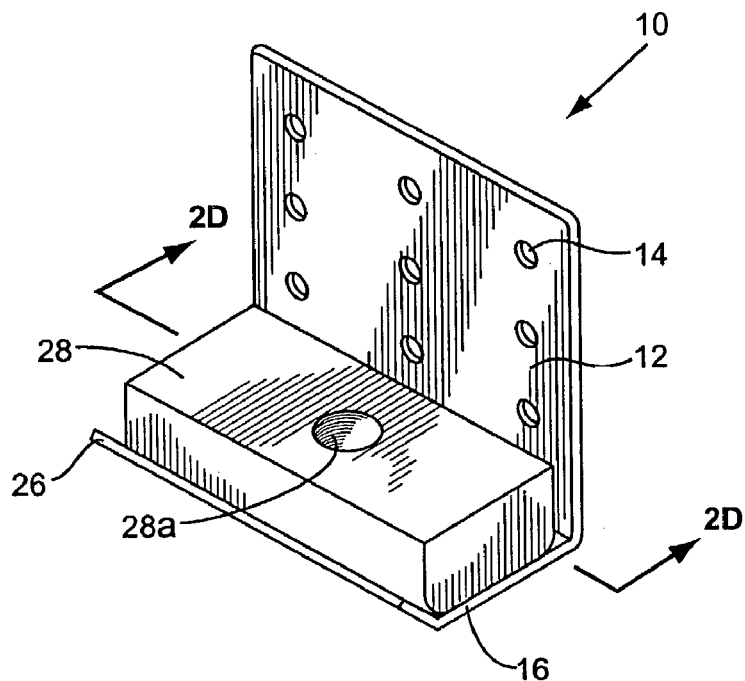
FIG. 2A is a perspective view of an alternate embodiment of the present invention.
Figure 2B:
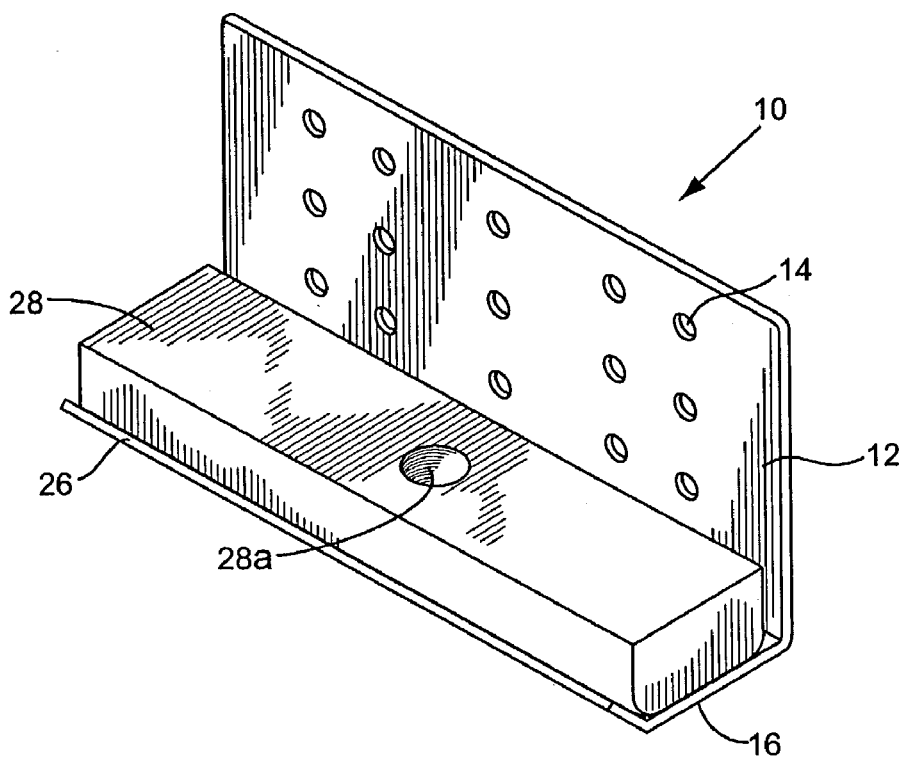
FIG. 2B is a perspective view of the connector of the present invention showing a somewhat wider embodiment than that shown in FIG. 2A.

Turning to FIGS. 2A and 2B, another embodiment of the connector 10 is shown therein. Basically the structure of the connector 10 as shown in FIGS. 2A and 2B conforms generally to the structure of the connector shown in FIGS. 1A and 1B. However, in the case of the embodiment illustrated in FIGS. 2A and 2B, there is provided, in addition to the structure already discussed, a reinforcing member or block 28. Reinforcing member or block 28 extends transversely over the top surface of the base plate 16. As shown in FIGS. 2A and 2B, when the connector includes an upturned flange 26, the reinforcing member 28 is generally confined or cradled between the upturned flange 26 and the connecting plate 12.

Formed centrally within the reinforcing member 26 is a central opening 28a that would align with the central opening 20 formed in the base plate 16. In addition, if additional fasteners are needed to secure the connector 10 to an underlying support structure, the reinforcing member 28 can be provided with additional openings that would align with other openings, such as openings 22, formed in the base plate 16.

About the underside of the reinforcing member 28, there may be provided a series of grooves or notches that are referred to as recesses 30. These recesses 30 are designed to receive and mate with the ribs 18 shown in FIGS. 1A and 1B. In the case of the embodiment shown in FIG. 2A, the underside of the reinforcing member 28 would be provided with two elongated recesses for receiving and mating with the two ribs 18 shown therein. Likewise, in the case of an embodiment such as shown in FIGS. 1A and 2B, the reinforcing member 28 would be provided with a series of four rib recesses 30.

Figure 2C:
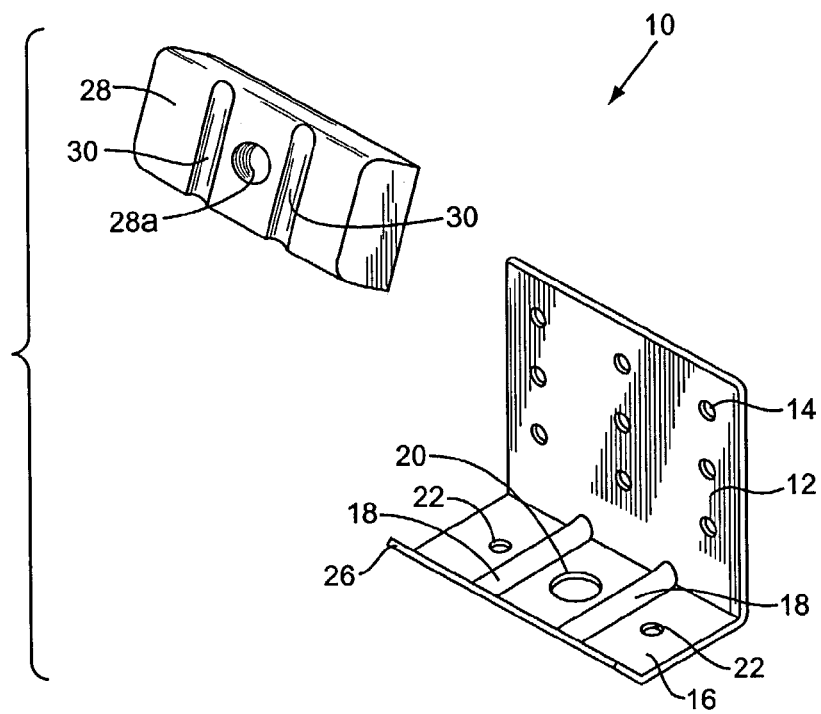
FIG. 2C is an exploded view of the connector showing the reinforcing member rotated so as to show the recesses formed on the bottom surface thereof.
Figure 2D:
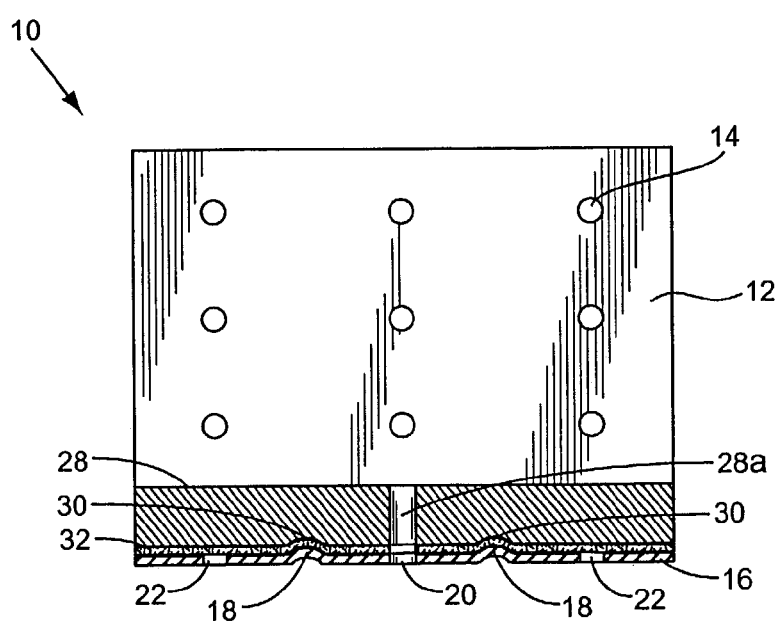
FIG. 2D is a cross-sectional view of the embodiment shown in FIGS. 2A and 2B taken through the line 2D-2D, and particularly illustrating that the reinforcing member could be secured to the base plate by an adhesive layer.

The reinforcing member of block 28 may in some embodiments be secured to the underlying base plate 16. For example, as indicated in FIG. 2D, the reinforcing member 28 is secured by an adhesive layer 32 to the underlying base plate 16.

In use, the connector 10 of the present invention may be used in various ways in building construction to secure one component to another component. In the way of an example, the connector 10 can be utilized to connect a stud, indicated generally by the numeral 50 in FIGS. 3 and 4 to an underlying or overlying support structure such as a floor, beam, etc. As shown in the drawings, the studs 50 are generally of the metal type and include a central web 52 flanked by a pair of flanges 54. Also, it is appreciated that in typical metal building construction that a U-shaped channel is often used as an interface between the studs 50 and an upper or lower support structure. In this regard, note in FIGS. 3 and 4 where there is provided an elongated channel indicated generally by the numeral 60 that receives opposed ends of the studs 50. Each channel 60 includes a central web 62 and a pair of flanges 64.

Figure 3:
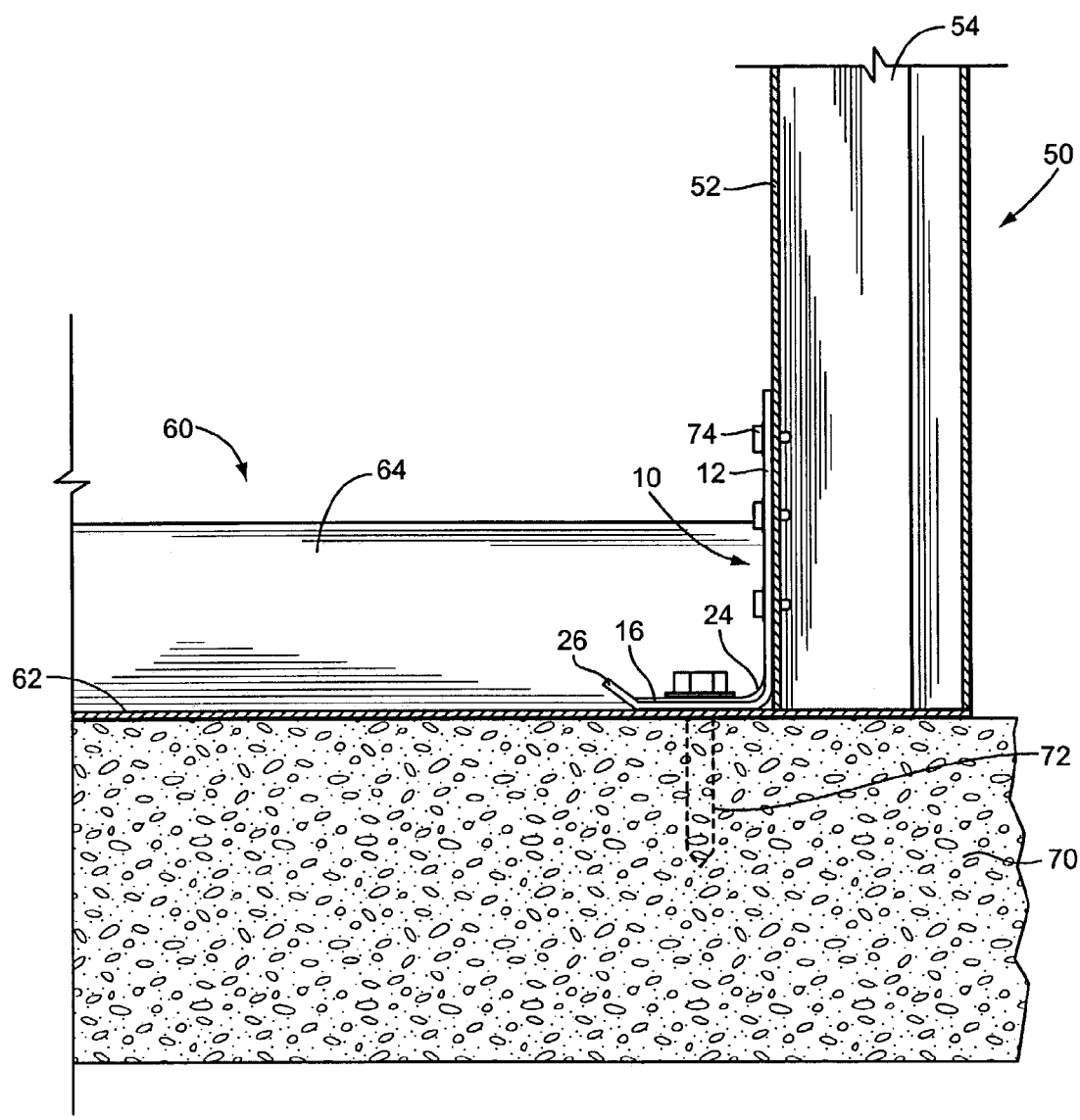
FIG. 3 is a fragmentary sectional view showing the connector of the present invention connecting a metal building stud to a lower channel and to an underlying concrete floor.

FIG. 3 shows in section the use of the connector 10 to connect a stud 50 to the channel 60. Note the provision of the underlying support structure 70 that supports the channel 60. In the embodiment illustrated in FIG. 3, a concrete floor section indicated by the numeral 70 underlies the channel 60 and supports both the channel 60 and the various studs 50 that extend upwardly from the channel 60. Also a lag screw 72 extends downwardly through the base plate 16 into the underlying concrete floor 70. Further, a series of screws or other fasteners 74 extend through the openings 14 formed in the connecting plate 12 and connect the connecting plate to the web 52 of the stud 50.

Figure 4:
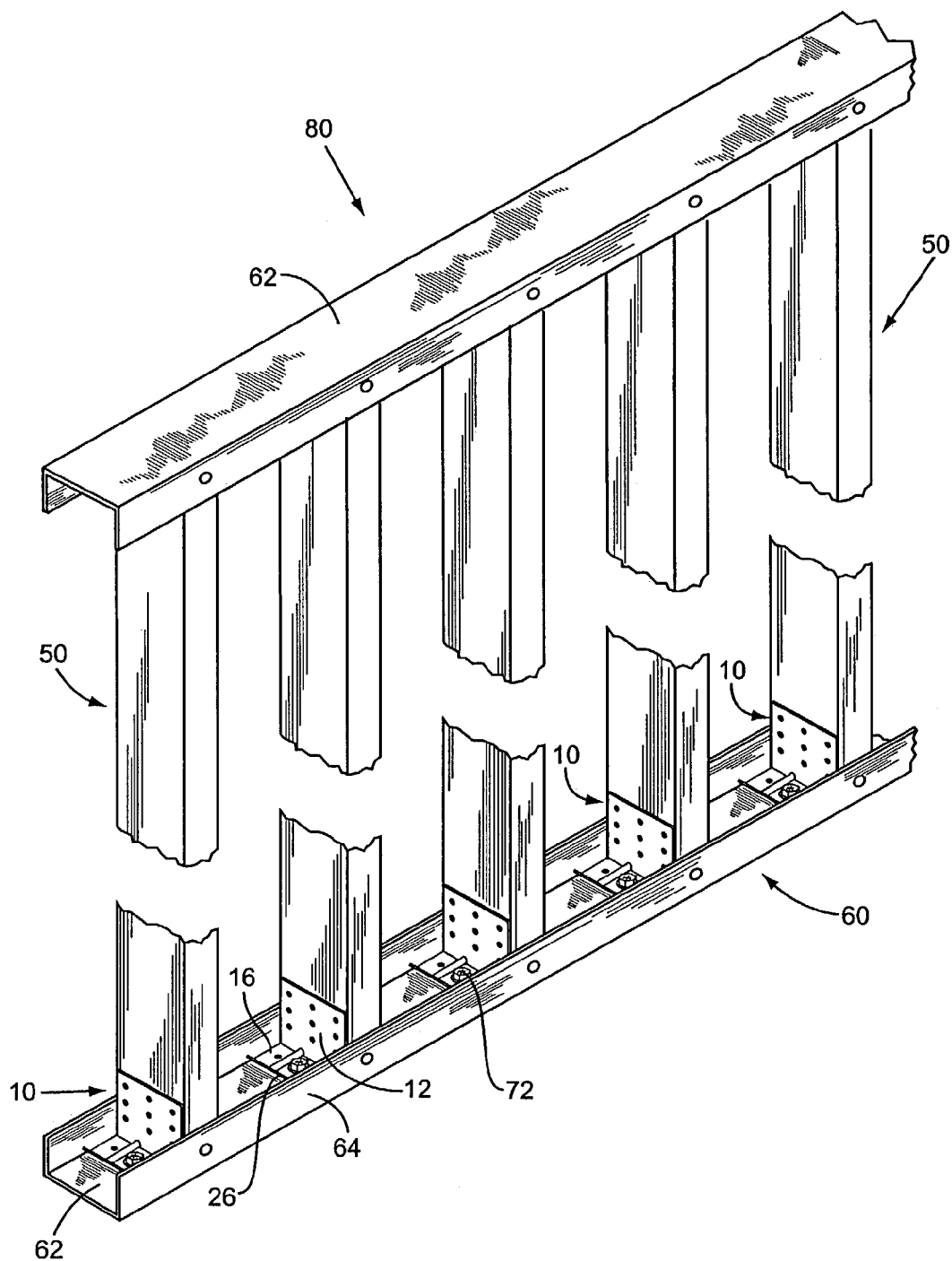
FIG. 4 is a perspective view of a wall section having connectors of the present invention incorporated therein.

Turning briefly to FIG. 4, there is shown therein a wall section indicated generally by the numeral 80. In this case, the wall section includes upper and lower channels 60 joined by a series of spaced apart studs 50. The connectors 10 of the present invention are specifically shown connecting the lower end portions of the studs 50 the lower channel 60. However, it is appreciated that the same connectors can be utilized by the upper portions of the studs 50 to connect the studs to the upper channel 60. Finally, both channels 60 would be disposed, in a typical application, adjacent a support structure such as a concrete floor, beam, etc. Therefore, the lag screw 72 extending through the base plate 16 of each connector would also extend into and connect to such an adjacent support structure.

The connector 10 of the present invention has numerous advantages. It is designed for strength and rigidity. In particular, it is designed to form a firm and rigid heavy duty connection between the opposed end portions of the studs 50 and any adjacent connected supporting structure.

The design of the connector including the ribs 18, the upturned flange 26 and the reinforcing member 28, enables the connector 10 to resist uplifting, horizontal and rotational loads that might be applied directly to or transferred to the connecting points where the studs 50 connect to the underlying or overlying channels and to the adjacent supporting structure.

Connector 10 may be constructed of various materials but it is contemplated that in one embodiment the connector would be constructed of metal. The embodiment illustrated herein is formed from a single metal piece by an appropriate stamping operation. Other fabrication methods could be used. The thickness or gauge of the material utilized for the connector can vary to suit various types of applications.

Metal Half Wall and Connector Therefor

Figure 5:
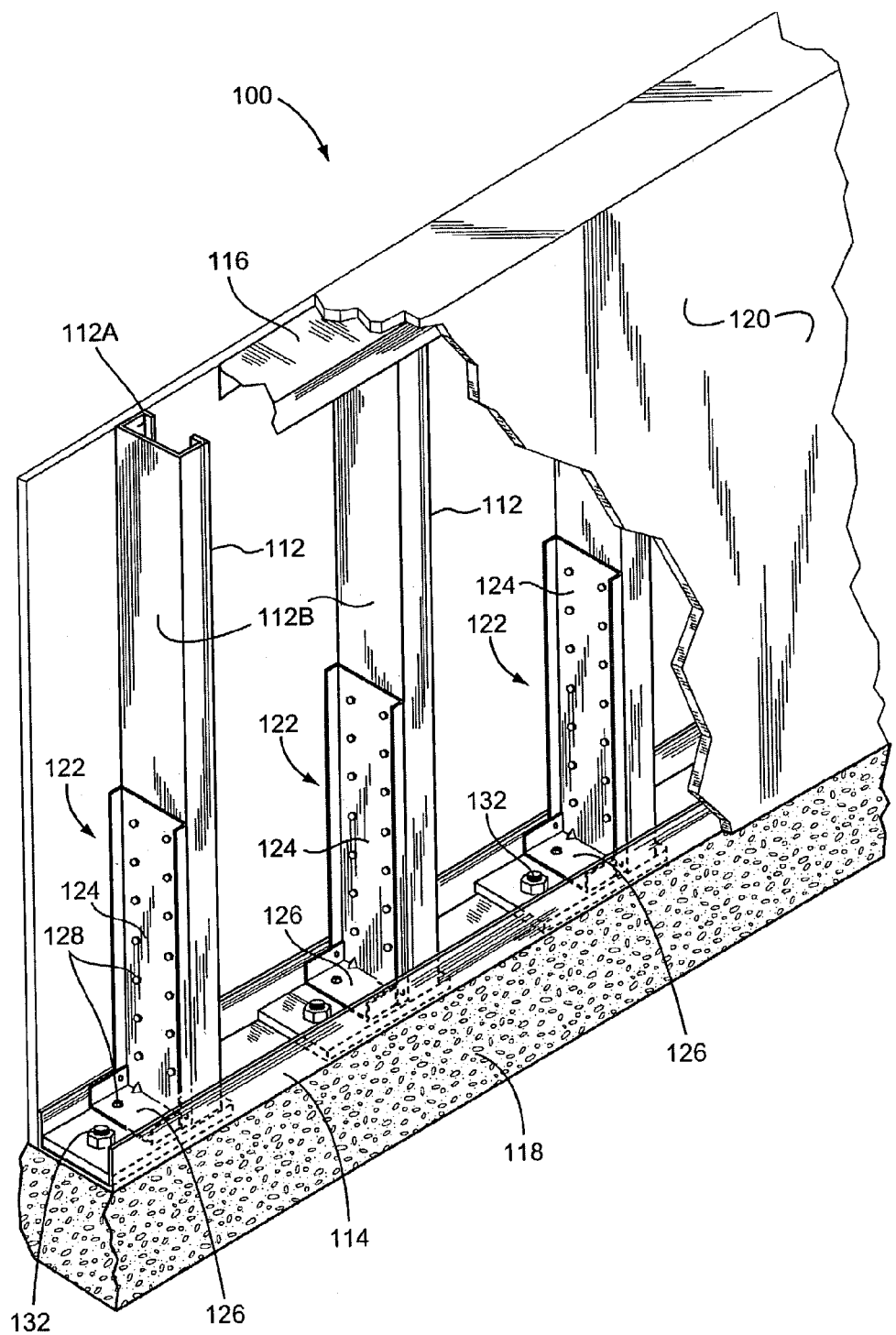
FIG. 5 is a fragmentary perspective view of a half-wall structure having the connector of the present invention incorporated therein.

With reference to FIG. 5, a metal half wall is shown therein and indicated generally by the numeral 100. Metal half wall 100 includes a series of spaced apart studs 112 extending between a lower track 114 and an upper track 116. Each stud is of a generally U-shaped configuration and includes a pair of flanges 112A and a web 112B extending between the flanges. As shown in the drawings, lower track 114 rests above an underlying support structure 118 such as a floor. Studs 112 are secured to both the lower track 114 and upper track 116. A series of connectors or connector assemblies, indicated generally by the numeral 122, connect the individual studs 112 to the lower track 114 and to the underlying support structure 118. Various types of conventional clips or brackets can be utilized to connect the upper portion of the studs 112 to the upper track 116. In conventional fashion, the metal half wall 100 includes an outer wallboard or drywall 120. As illustrated in FIG. 5, the metal half wall 100 is designed to be secured or anchored to the underlying support structure 118, such as a concrete floor, while the upper portion of the half wall 100 remains unsupported in so far as the same is not connected to an overhead support structure such as ceiling joints, etc. The term metal half wall is meant to include any partial wall, or any wall structure that is generally unsupported about the top portion thereof. It is appreciated that the height of the half or partial wall 100 can vary.

As noted above, each of the metal studs 112 are connected to the lower track 114 and ultimately to the underlying support structure 118 by a connector 122. Connector 122 in its most basic form, includes an elongated member 124 and an end plate 126. Various alterations may be made to the elongated member 124 and the end plate 126 as will be discussed below. Each connector 122 is provided with a series of fasteners 128 (FIG. 5). When the connector 122 is disposed adjacent a stud 112, one group of fasteners is utilized to connect the elongated member 124 via openings 124E to the web 112B of a respective stud 112. Another group of the fasteners 128 are utilized to secure the end plate 126 to the underlying lower track 114 and to the underlying support structure 118. The fasteners can assume various conventional forms. In one embodiment, the fasteners would include an array of sheet metal screws for connecting the elongated member 124 with the stud 112 and other fasteners suitable, for example, to extend into a concrete floor for the purpose of attaching the end plate 126 to the underlying lower track 114 and the underlying support structure or floor 118.

Basically, the elongated member 124 and end plate 126 can be of an integral construction. In one case the two components, that is elongated member 124 and the end plate 126, can be constructed of a single piece of material. In this arrangement, the end plate 126 during a fabrication process is simply bent out of the plane of the elongated member 124 such that the end plate extends generally normal or perpendicular to the plane of the elongated member 124. In another case, the end plate 126 can be a separate component that is welded or otherwise secured to the terminal end of the elongated member 124.

Connector 122 along with its components form a connector assembly. In one embodiment, the connector assembly may include a reinforcing plate 130 for carrying relatively heavy loads. As illustrated in the drawings, the reinforcing plate is referred to by the numeral 130 and includes one or more openings and a corresponding number of fasteners 132. When employed within the metal half wall 100, the reinforcing plate 130 is disposed below the lower end of a respective stud 112 and below the end plate 126. Expressed in another way, the end plate 126 as well as the adjacent stud rests atop the reinforcing plate 130.

In other cases, where the anticipated loads are not so large, the end plate 126 can be positioned directly adjacent the lower track 114. Here the end plate 126 is simply secured directly to the lower track 114 and at least indirectly to the underlying support structure 118.

The design of the end plate 126 can vary. One embodiment for the end plate 126 is shown in the FIGS. 5 and 9. In this embodiment, the end plate 126 assumes a generally channel shape and as such includes a pair of flanges 136 and a pair of openings 138. The elongated member also includes a pair of flanges and the flanges of the elongated member 124 are secured via rivets 140 to the flanges 136 of the end plate 126 in this embodiment. In certain cases, it is contemplated that the end plate 126 can be the formed by bending an end portion of the connector 122 to where the end plate 126 projects outwardly at an angle, typically approximately 90°, to the elongated member 124. In other examples, the end plate 126 can be a separate member and can be fabricated or attached to the elongated member by rivets, weldment, or other suitable securing means.

Figure 6:
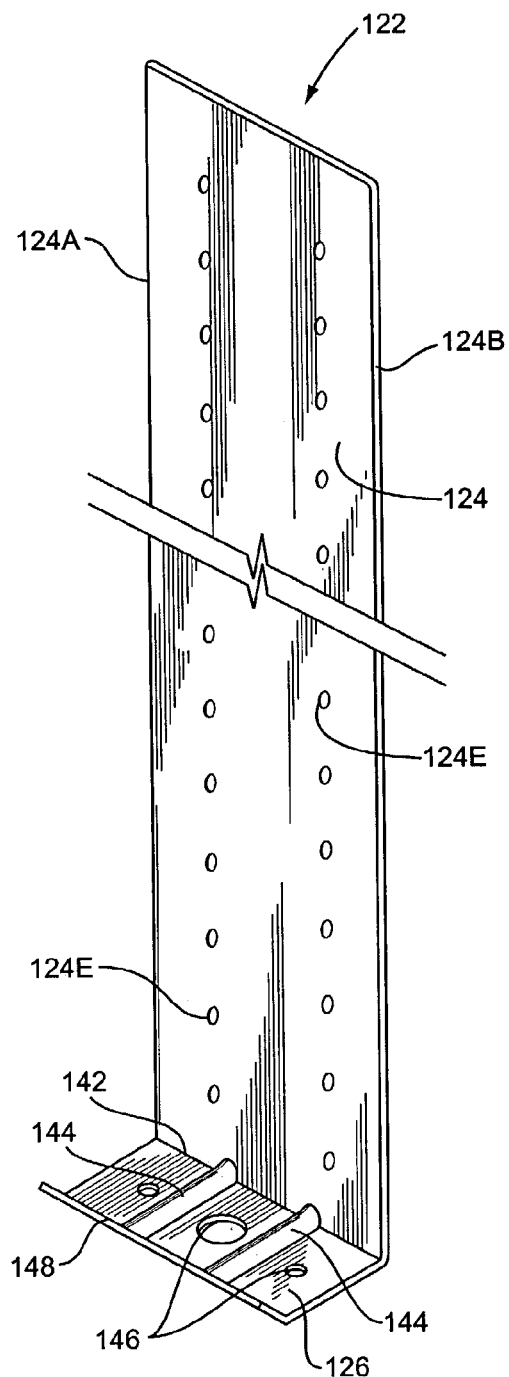
FIG. 6 is a perspective view of one embodiment of a connector for the half-wall shown in FIG. 5.

As seen in the drawings, the elongated member 124 that forms a part of the connector 122 can assume various configurations also. In the embodiment of FIG. 6, the elongated member 124 includes a pair of opposed edges 124A and 124B. In other words, the elongated member 124 of this embodiment does not include any flanges but simply is formed by an elongated planar member.

Further, the end plate of this embodiment (FIG. 6) includes a juncture 142 formed between the elongated member 124 and the end plate 126. Formed in the end plate 126 is a pair of spaced apart ribs 144 that extend generally perpendicular to the juncture 142. A series of openings 146 are spaced along the end plate 126 to accommodate various fasteners 128. Finally, in the embodiment illustrated in FIG. 6 the end plate includes an upturned flange 148 that extends along an edge of the end plate opposite juncture 142. This upturned flange 148 imparts strength to the end plate 126.

Figures 8, 9:
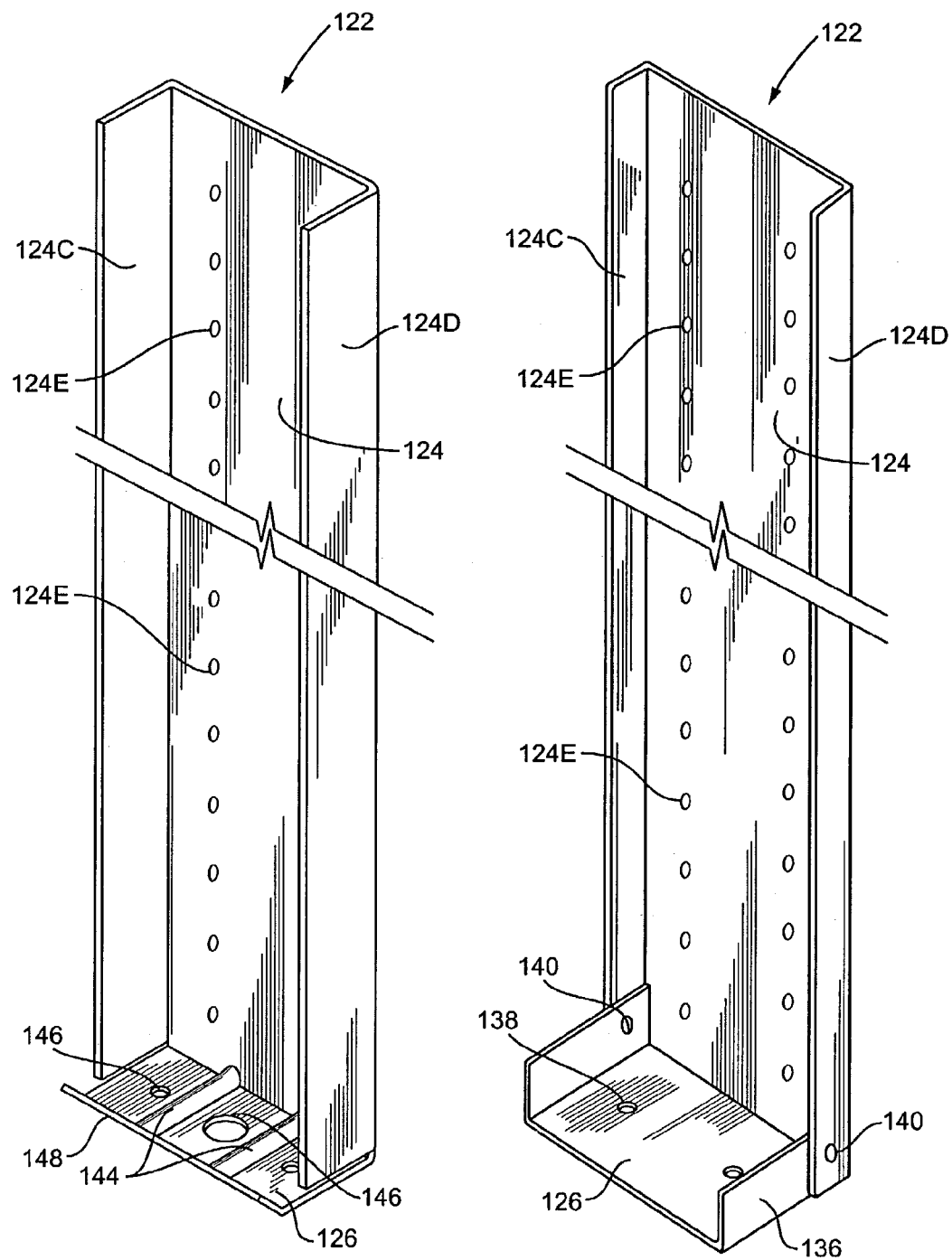
FIG. 8 is a perspective view of a third embodiment for a connector for the half-wall structure.
FIG. 9 is yet another embodiment for the connector for the half-wall structure shown in FIG. 5.

The embodiment of the connector 122 shown in FIG. 8 is similar to the embodiment just described above and shown in FIG. 6 with the exception that the elongated member 124 includes a pair of spaced apart flanges 124C and 124D. These flanges are bent at generally a 90° angle to a central portion of the elongated member 124. In this case, the flanges 124C and 124D include lower terminal edges that terminate just short of the upper surface of the end plate 126. As seen in FIG. 8, there is a slight space between the lower edge of the flanges 124C and 124D and the upper surface of the end plate 126.

Figure 7:
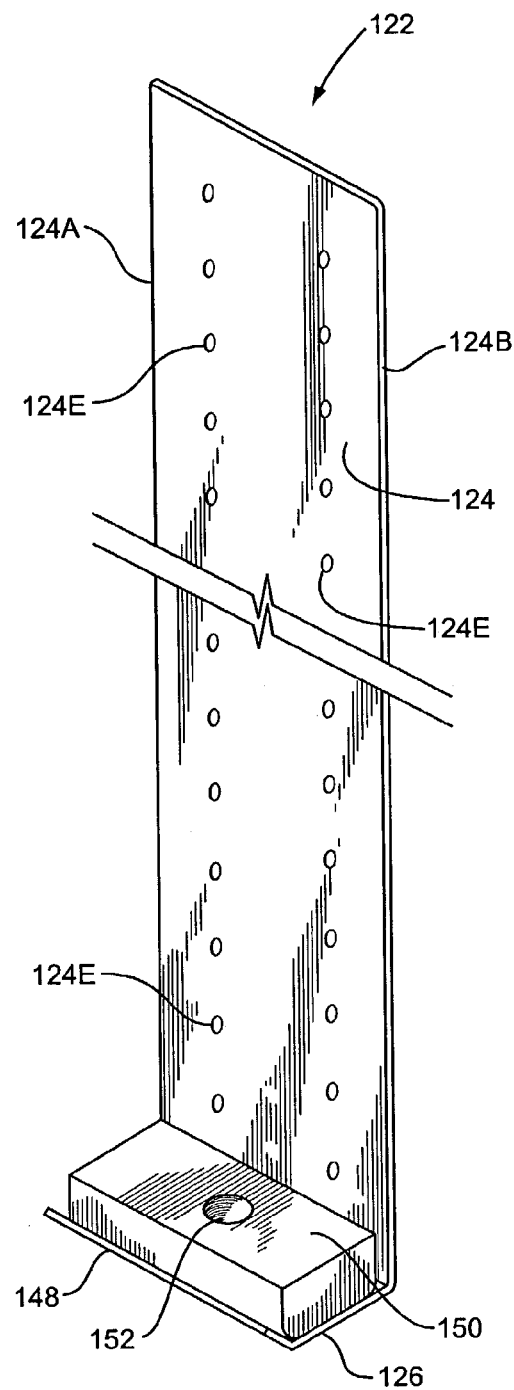
FIG. 7 is a perspective view of another embodiment of a connector for the half-wall structure.

FIG. 7 illustrates yet another embodiment of the connector 122. This embodiment is similar to the embodiment shown in FIG. 6 with the exception that the connector assembly is provided with a block 150. There is provided a pair of rib recesses about the lower surface of the block 150. See FIG. 2C. This enable block 150 to rest squarely on the upper surface of an end plate 126 such as shown in FIG. 7. That is, the ribs 144 shown in FIG. 6 would project and seat into the rib recesses formed on the underside of the block 150. Block 150 further includes an opening 152 that would align with an opening formed in the end plate 126. A fastener 128 would be utilized to connect the block 150 and end plate 126 to the underlying track 114 and to the underlying support structure 118.

As seen in FIG. 5, the connector assembly 122 is designed to be connected about a lower portion of the metal half wall 100. Note that the elongated member 124 is adapted or designed to fit flush against the web 112 of an adjacent stud. In a preferred embodiment, it is contemplated that the height of the connector 122 would be significant. That is, the connector 122 would extend upwardly along and adjacent the stud that it connects to for a substantial distance. It is contemplated that the height of the connector 122 would, in a preferred design, be at least approximately ¼ of the height of the adjacent stud 112. Typically, the connector 122 would be provided in 2,3,4, and 5-foot lengths. In any event, the placement of the connector 122 adjacent a stud 112 results in the end plate 126 being positioned adjacent the same stud and over the lower track 114 and over the underlying support structure 118. By directing the fasteners 128 through both the elongated member 124 and the end plate 126, the studs 112 are firmly anchored and supported about the lower portion of the metal half wall, and this support tends to minimize the tendency of the half wall 100 to tilt one way or another and also discourages the twisting and rotation of the individual studs 112 in response to various side loads applied to the wall.

In the FIG. 5 illustration of the half-wall, the connector 122 shown in FIG. 9 is employed therein. However, it should be understood that any one of the various connector embodiments illustrated in FIGS. 6-9 could be employed in similar fashion within the half-wall 100. Further, in the illustration of FIG. 5, each of the connectors 122 and the adjacent stud 112 is disposed on the reinforcing plate 130. Reinforcing plate 130 is particularly beneficial where the half-wall has to withstand substantial side loads or forces. Accordingly, in many applications, the reinforcing plates 130 would not be required. In such cases, the connectors 122 and studs 112 would rest directly on the lower tract 114.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A partial metal wall supported in part at least by a support structure, comprising:
   a. at least one elongated bottom track having a web and a pair of flanges;
   b. a series of spaced apart partial studs extending from the track with each stud including a pair of flanges and a web extending between the flanges of the studs;
   c. the partial studs being seated into the bottom track such that the flanges of the studs lie inwardly of the flanges of the track and wherein the flanges of the studs and the flanges of the track lie directly adjacent each other;
   d. a series of connectors securing the studs to the track;
   e. each connector including:
      i. an elongated member that extends adjacent the web of a stud and includes opposite ends;
      ii. an end plate integral with the elongated member and turned at an angle with respect to the elongated member;
      iii. a series of fasteners for securing the elongated member to the web of the adjacent stud and for securing the end plate to the track; and
   f. wherein the bottom track, partial studs, and connectors form at least a part of the partial metal wall, a reinforcing plate disposed between each stud and connector, and the track.

2. The partial metal wall of claim 1 including a series of reinforcing plates, and wherein the track forms a lower track of the partial metal wall and the reinforcing plates are disposed on the lower track and wherein the studs and connectors rest on the reinforcing plates.

3. The partial metal wall of claim 2 wherein each of the series of reinforcing plates are longitudinally spaced in the track with each reinforcing plate disposed under one stud and one connector.

4. A partial metal wall supported in part at least by a support structure, comprising:
   a. at least one elongated bottom track having a web and a pair of flanges;
   b. a series of spaced apart partial studs extending from the track with each stud including a pair of flanges and a web extending between the flanges of the studs;
   c. the partial studs being seated into the bottom track such that the flanges of the studs lie inwardly of the flanges of the track and wherein the flanges of the studs and the flanges of the track lie directly adjacent each other;
   d. a series of connectors securing the studs to the track;
   e. each connector including:
      i. an elongated member that extends adjacent the web of a stud and includes opposite ends;
      ii. an end plate integral with the elongated member and turned at an angle with respect to the elongated member;

iii. a series of fasteners for securing the elongated member to the web of the adjacent stud and for securing the end plate to the track; and f. wherein the bottom track, partial studs, and connectors form at least a part of the partial metal wall, wherein each connector including the elongated member and the integral end plate assumes a channel configuration and includes a web and a pair of flanges, the channel configured connectors and partial studs are connected in back-to-back relationship where the flanges of the connectors and the flanges of the partial studs lie on opposite sides of the connection formed by the connectors and partial studs.

5. The partial metal wall of claim 4 wherein the flanges of the integral end plate of the connectors are connected to the flanges of the bottom track.

* * * * *